United States Patent [19]

Pertl et al.

[11] 4,085,447
[45] Apr. 18, 1978

[54] RIGHT JUSTIFIED MASK TRANSFER APPARATUS

[75] Inventors: Jerry Hudson Pertl, Bloomington; Glen Roy Kregness, Hopkins, both of Minn.

[73] Assignee: Sperry Rand Corporation, New York, N.Y.

[21] Appl. No.: 720,930

[22] Filed: Sep. 7, 1976

[51] Int. Cl.² .............................................. G06F 7/02
[52] U.S. Cl. .................................................... 364/900
[58] Field of Search .............................. 364/200, 900

[56] References Cited

U.S. PATENT DOCUMENTS 3,370,274  2/1968  Kettley ................................ 364/200
3,430,202  2/1969  Downing ............................. 364/200

Primary Examiner—James D. Thomas
Attorney, Agent, or Firm—William D. Bauer; Kenneth T. Grace; William E. Cleaver

[57] ABSTRACT

This invention relates to a right justified mask transfer apparatus which may be effectively utilized in a digital data computer. A right justified mask transfer register is provided which holds the result of a logical bit-by-bit ANDing of a multi-bit data word with a multi-bit mask work such that only those bit positions for which the mask word are of a predetermined binary significance are collected contiguously in the mask transfer register, all other bit positions being ignored. Further operations on intermediate digital data computations may be more easily performed by utilizing the right justified mask transfer function to select certain data bits or fields.

8 Claims, 14 Drawing Figures

RIGHT JUSTIFIED MASK TRANSFER APPARATUS

GOVERNMENT CONTRACT

The invention herein described was made in the course of, or under a contract or a subcontract thereunder, with the Department of the Navy.

BACKGROUND OF THE INVENTION

In digital data devices it is common to provide a hardware implemented "compare mask" instruction for the benefit of the software user. In implementing such a compare mask function, certain specified bits in two object words are compared with each other, the specified bits being dependent upon the bit permutations set in a separate mask register. In these prior art schemes, the results of the comparison for those certain bits are then transferred to a result register in the same exact bit positions or order of significance as had been maintained in the original object words. This result is then available for further software operations. However, if the bits of predetermined binary significance in the mask register are not contiguous, or right justified, further software operations must be performed if it is desired to collect the resultant compared bits in a contiguous pattern.

SUMMARY OF THE INVENTION

The present invention provides an apparatus for the contiguous assembly of such resultant non-contiguous, non-right justified bits. The function performed by the right justified mask transfer apparatus of the present invention is to create a contiguous right justified result of the bit-by-bit comparison of a data word with a mask word. A series of non-contiguous bits contained in a mask word controls a mask operation with an n-bit data word and arranges the result of the mask operation contiguously in a result register. This function serves to increase the speed of software decisions based upon the contents of fields in a computer data word. Thus, bit manipulation required to look at several data fields of a data word individually is eliminated. The invention also may be effectively used to create a relative address for a look-up table or a constant that can be further compared against.

The preferred embodiment provides a digital logical network for implementing a mask transfer function so that a series of non-contiguous bits contained in an n-bit mask word controls a mask operation with an n-bit data word and arranges the result of the mask operation contiguously in a result register. It includes a mask shifting means selectively coupled to receive the mask word and functioning to sequentially present as an output an m-bit group of contiguous bits contained in the mask word; a mask bit set means selectively coupled to the mask shift output for determining the number of bits which are set to a logical 1 in the mask shift output; a data shifting means selectively coupled to receive the data word and functioning to sequentially present as an output an m-bit group of contiguous bits contained in the data word; data comparison means selectively coupled to the data shift output and controlled by the mask shift output for performing a bit-by-bit logical AND operation between the mask shift output and the data shift output and for shifting the result of the logical AND operation only for bit positions set to a logical one in the mask shift output to contiguous bit positions and disregarding all other bit positions; and a result collecting means selectively coupled to the data comparison means in the result register and responsive to the mask bit set means for collecting the successive results of the data insertion means in such a manner that the successive results are kept contiguous throughout successive changes in the mask shifting means and the data shifting means.

OBJECTS

It is an object of the present invention to provide a mask transfer function so that a series of non-contiguous bits contained in an n-bit mask word controls a mask operation with an n-bit data word and arranges the result of the mask operation contiguously in a result register.

It is another object of the present invention to eliminate the bit manipulation required to examine several data fields of a data word individually.

DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENT

The present invention provides a digital logical network for implementing a mask transfer function so that a series of non-contiguous bits contained in an n-bit mask word controls a mask operation with an n-bit data word and arranges the result of the mask operation contiguously in a result register. The function includes a bit-by-bit comparison of a data word containing a plurality of bits with a mask word containing a plurality of bits, the result of the comparison being a logical one where both the bit in the data word and the bit in the mask word are both logical ones and the result of the comparison being a logical zero if either the bit in the data word or the bit in the mask word is a logical zero and a transfer of only the bits of the result which correspond to bits in the mask word which are logical ones to a result register in a contiguous location therein, the remaining bits of the result register being a logical zero.

Figure 1:
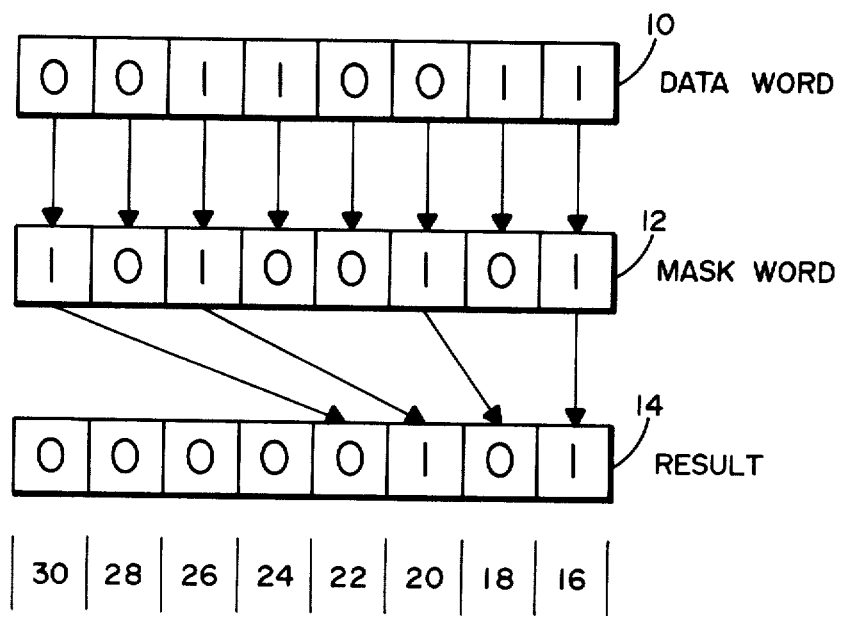
FIG. 1 provides a functional representation of the mask transfer function of the present invention.

This function may be utilized by the software of a digital data device in collecting non-contiguous bits in a data word in a right justified contiguous position in a result register. An example of this operation is illustrated in FIG. 1. There, an exemplary binary representation of a data word 10 and a mask word 12 is given, as is the result word 14. The respective bit positions of each of these 8-bit words is represented by numerals 16 - 30. The bits in the data word 10 which occupy the same position in the mask corresponding to a "1" are transferred to the result word 14. In addition, these transferred bits are shifted to a right justified contiguous location in the result word 14. More specifically, the first bit in the mask word set to a logical one is bit position 16. As is shown, the contents of bit position 16 of data word 10 is transferred to bit position 16 of result word 14. Since bit position 18 of the mask word 12 is a logical zero, no transfer is made of the data in bit position 18 of the data word 10. Bit position 20 of mask word 12 is a logical one, so, as in the case of bit position 16, bit position 20 of data word 10 is transferred to the result word 14. However, bit position 20 of data word 10 is transferred to the next higher contiguous bit position in the result word not already occupied instead of a direct corresponding bit position transfer. That is, the contents of bit position 20 of data word 10 is transferred to bit position 18 of result word 14, in this case a logical zero. In a corresponding manner, bit positions 22, 24 and 28 are ignored since they are a logical zero in mask word 12. However, bit position 26 and bit position 30 of data word 10 are transferred to the result word 14 because those corresponding bit positions in mask word 12 are a logical one. Bit position 26 of data word 10 is transferred to bit position 20 of result word 14, the next contiguous, unused result word bit position. Correspondingly, bit position 30 of data word 10 is transferred to bit position 22 of result word 14.

Figure 2:
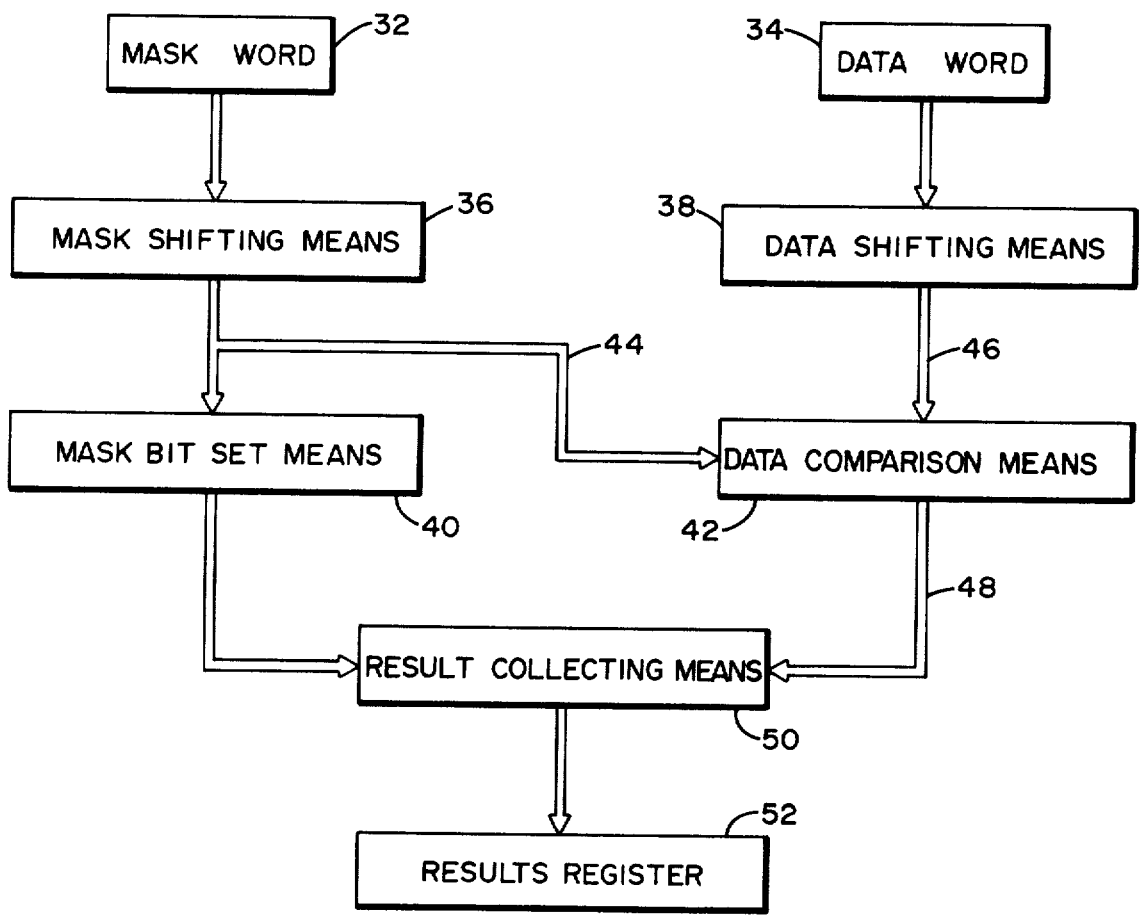
FIG. 2 shows a block diagram of the hardware necessary to perform the function described in the present invention.

A block diagram of the hardware implementing the right justified mask transfer function of the present invention is illustrated in FIG. 2. First, illustrated are a mask word register 32 and a data word register 34. The mask word register 32 holds the multi-bit mask word 12 of FIG. 1. The data word register 34 in FIG. 2 holds the data word 10 of FIG. 1. The mask word register 32 is coupled to a mask shifting means 36. The mask shifting means 36 functions to sequentially present on the output lines in cable 44, in a predetermined order, signals representing groups of contiguous bits contained in the mask word register 36. The data word register 34 is coupled to a data shifting means 38. The data shifting means 38 performs an analogous function on the data word register 34 as the mask shifting means 36 performs upon the mask word register 32. That is, the data shifting means 38 operates to sequentially present on the output lines in cable 46, in a predetermined order, signals representing groups of contiguous bits contained in the data word register 34. The mask shifting means 36 and data shifting means 38 combine to allow operational blocks to be described below to perform their operations iteratively upon a portion of each of the mask word register 32 and a portion of the data word register 34. The results of the successive iterations are then collected in a block 50.

A "mask bit set means" 40 is coupled to the output of the mask shifting means 36. The mask bit set means 40 determines at any given time the number of bits emanating from the mask shift means 36 which are set to a predetermined binary state, e.g., a logical one. As will be seen, this step is a necessary preliminary in determining the manner in which the result of subsequent operations is to be collected.

The output from the mask shifting means 36 is also coupled to a data comparison means 42. The data comparison means 42 is responsive to the mask shifting means 36 and is also coupled to the data shifting means 38 and performs a bit-by-bit logical AND operation between the individual bits in the mask shift output cables 44 and the data shift output cable 46 and shifts the results of such logical AND operations to the right such that they are assembled in a contiguous fashion. Only those bit positions which are set to a logical one in the mask shift output 44 are shifted. Thus, the data insertion means 42 collects, as an intermediate result, the results of partial right justified mask transfer operations performed upon only a portion of the bits contained in the mask word register 32 and the data word register 34.

This intermediate output represented by signals on the lines in cable 48, is coupled to a result collecting means 50 which is also responsive to the output from the mask bit set means 40. The result collecting means 50 then, depending upon how many bits are set to the logical one state in the mask shift output 44, as determined by the mask bit set means 40, collects the successive results of the intermediate result 48 of the data insertion means 42 in such a manner that the successive results are kept contiguous throughout successive changes in the mask shifting means 36 and data shifting means 38.

The result collected from the result collecting means 50 is then finally transferred to a result register 52.

The detailed logical schematic diagram of the circuit embodying the present invention is illustrated in FIG. 3. Here the mask word register 54, in FIG. 3a, performs the same function as the mask word register 32 illustrated in FIG. 2. The data word register 56, in FIG. 3b, performs the same function as the data word register 34 in FIG. 2. In the same manner, the shift register 58, in FIG. 3a, along with its associated coupling to the mask word register 54 performs the same function as the mask shifting means 36 in FIG. 2. Also, shift register 60, in FIG. 3b, along with its associated coupling to the data word register 56, performs the same function as the data shifting means 38 in FIG. 2. Further, selectors 62, 64 and gate 66, in FIG. 3c, along with the associated coupling with the shift register 58, perform the same function as the mask bit set means 40 of FIG. 2. Still further, the selectors 68, 70 and 72, in FIG. 3d, and the associated coupling with the shift register 60 in FIG. 3b, perform the same function as the data comparison means 42 of FIG. 2. The shift circuits 74 - 89, in FIGS. 3e, 3f and 3g, along with register 90, in FIG. 3b, and NOR circuit 92, in FIG. 3c, perform the same function as the result collecting means 50 of FIG. 2. And finally, register 94, in FIG. 3h, performs the same function as the result register 52 of FIG. 2. Now that the functional correspondence between the various circuits illustrated in FIG. 3 and the block diagram of FIG. 2 has been established, the detail interconnection of the circuits in the schematic representation of FIG. 3 will be explained.

Figure 3A:
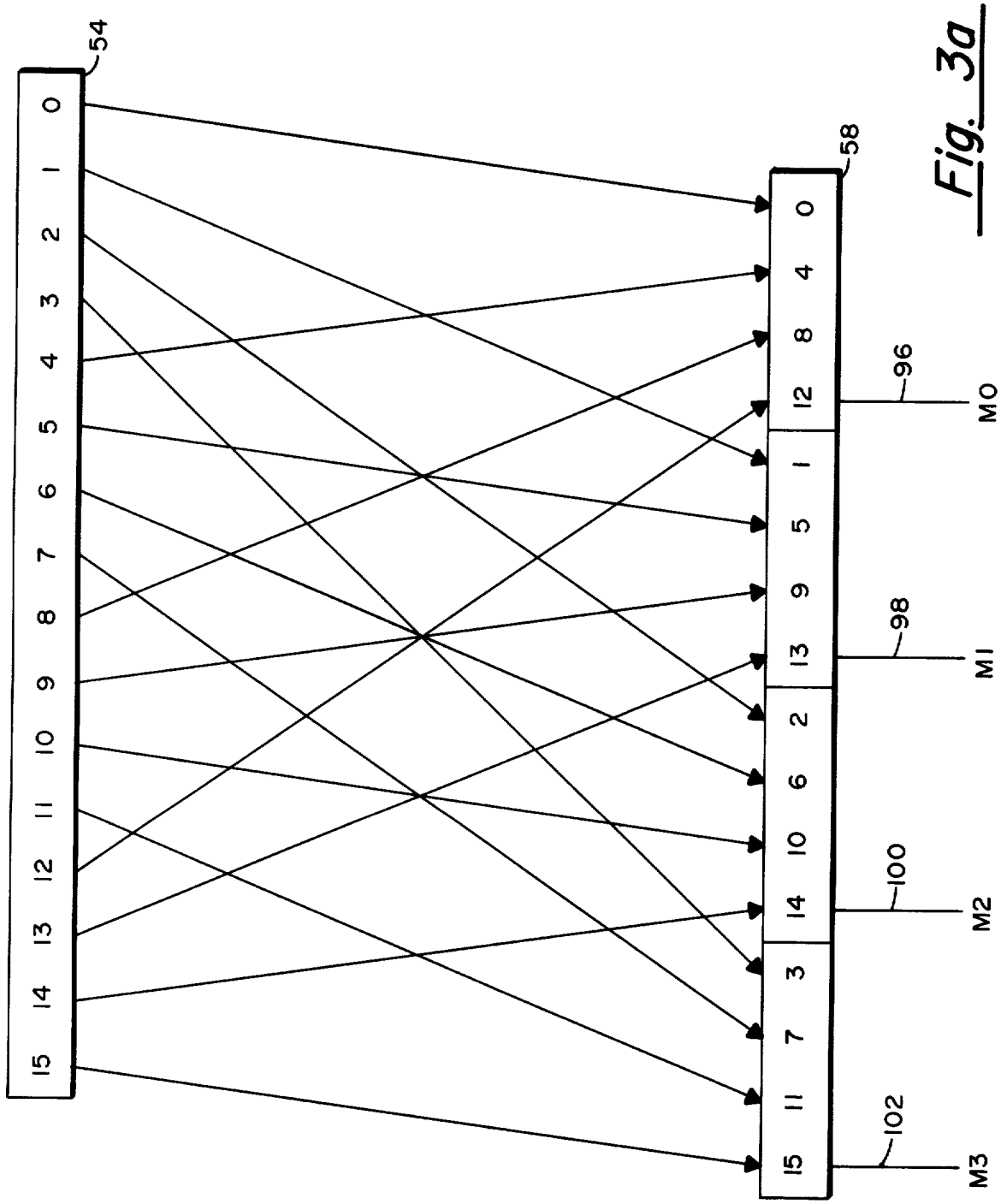
FIG. 3 comprised of FIGS. 3a, 3b, 3c, 3d, 3e, 3f, 3g and 3h, provides a schematic representation of the logical circuits utilized in performing the operation described in the present invention.

Register 54 in FIG. 3a is available to hold the mask word for use in the right justified mask transfer operation. With no limitation intended, for purposes of explanation only register 54 is shown as a 16-bit register. These 16 bits are illustrated in FIG. 3a from bit position zero having the least significance with increasing significance to the left. Bit 15 has the most significance. It is to be noted that these bit positions are in the exact order of increasing significance from right to left. An example of a circuit available for implementing such a register is Texas Instrument Type No. SN54116.

Figure 3B:
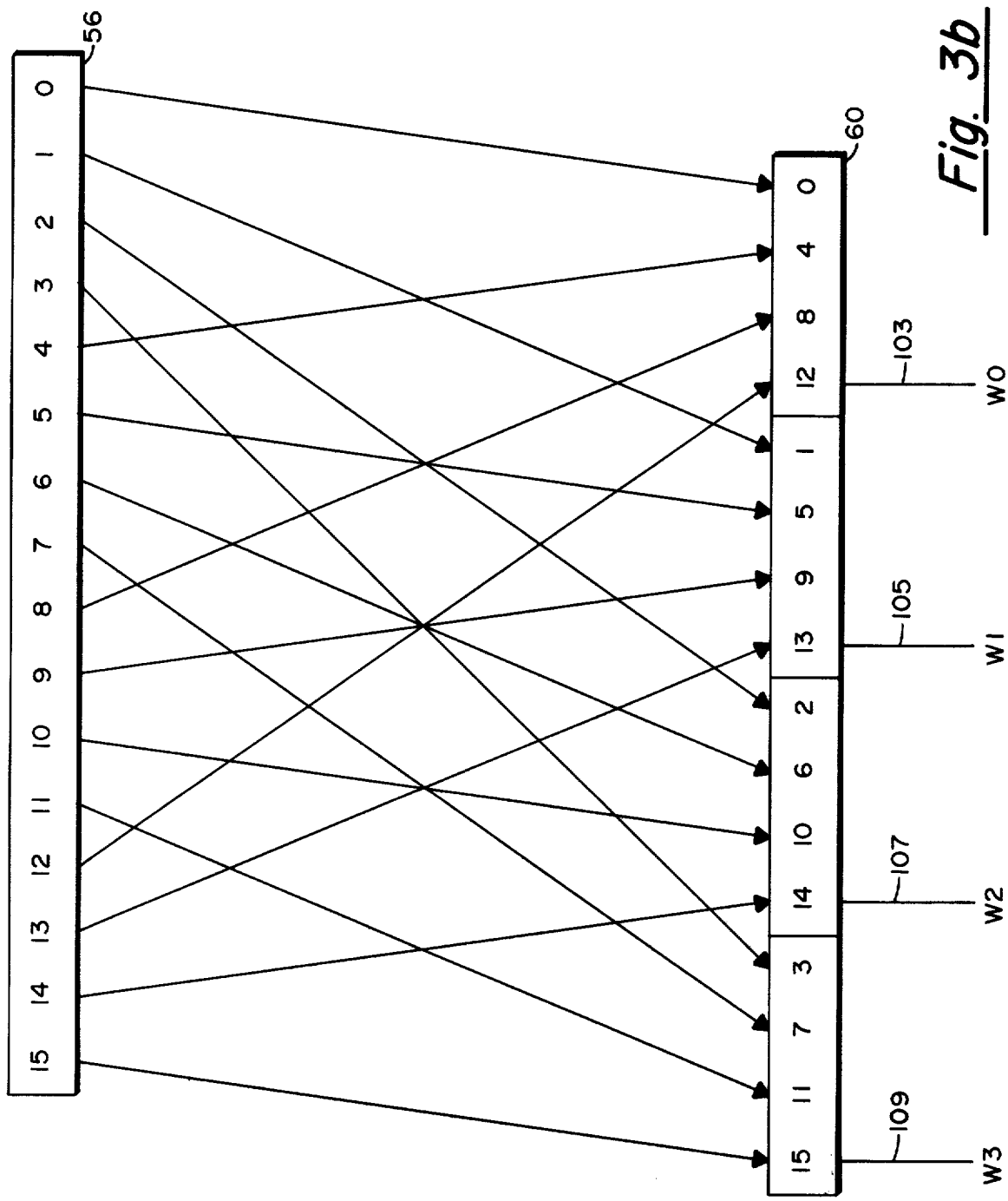

A similar register is used to hold the data word for use in the right justified mask transfer operation. This register is illustrated in FIG. 3b by reference numeral 56. The register 56 in this particular embodiment is also 16 bits long. Again, bit zero at the right end of the register, has the least significance and bit 15 at the left, has the most significance. Again, it is to be noted that the bits are arranged in the data word register 56 in exact order of increasing significance from right to left.

An n-bit partitioned shift register is illustrated in FIG. 3a by reference numeral 58. In the exemplary embodiment being described a 16-bit partitioned shift register is utilized since a 16-bit mask word is assumed in this embodiment of the right justified mask transfer function. This partitioned shift register is capable of being parallel loaded and upon receipt of a shift command, is capable of shifting its contents one bit position in either the right or the left direction within each of its four 4-bit partitions. An example of a circuit which may be utilized in construction of such a shift register is Texas Instrument Type No. SN54194, a 4-bit shift register. Four such 4-bit shift circuit may be concatenated to form the entire shift register 58. However, interconnection between such 4-bit shift circuits is not necessary since shifting between partitions is not necessary. Each 4-bit shift register segment is represented in the diagram as a partition in the shift register 58. The shift register data inputs are selectively coupled to the outputs of the mask word register 54 in such a manner that bit 0 of shift register 58 is loaded from bit 0 of mask word register 54; bit 1 of shift register 58 is loaded from bit 1 of mask word register 54, etc. Note that although there is a one-for-one correspondence between corresponding bits in the mask word register 54 and the mask shift register 58, the significance of the bit positions in the shift register 58 are scrambled from those in the mask word register 54. This scrambling is done for the purpose of effecting a 4-bit functional shift with a shift register capable of shifting only one bit position at a time. Since adjacent bit positions within one segment of the shift register 58 represent mask word register bits which are 4 bits apart in significance, a 1-bit shift in shift register 58 effects a 4-bit shift in absolute bit significance as determined from mask word register 54. Only four bit positions are utilized as outputs from the shift register 58. Specifically, bit positions 12, 13, 14 and 15 are represented as outputs from shift register 58. It is to be noted that after a one bit shift has taken place in the shift register 58, the next four bit segment from the mask word register 54 would be available as the output from the shift register 58; that is, bits 8, 9, 10 and 11; and so on for further shifts.

Shift register 60 in FIG. 3b may be constructed in a fashion similar to shift register 58. In fact, shift register 60 performs the exact function and has the same exact interconnections with respect to the data word register 56 as the mask shift register 58 has with the mask word register 54. The construction, operation and function of shift register 60 is directly analogous to the construction, connection and function of shift register 58 and therefore, need not be described in detail.

Figure 3C:
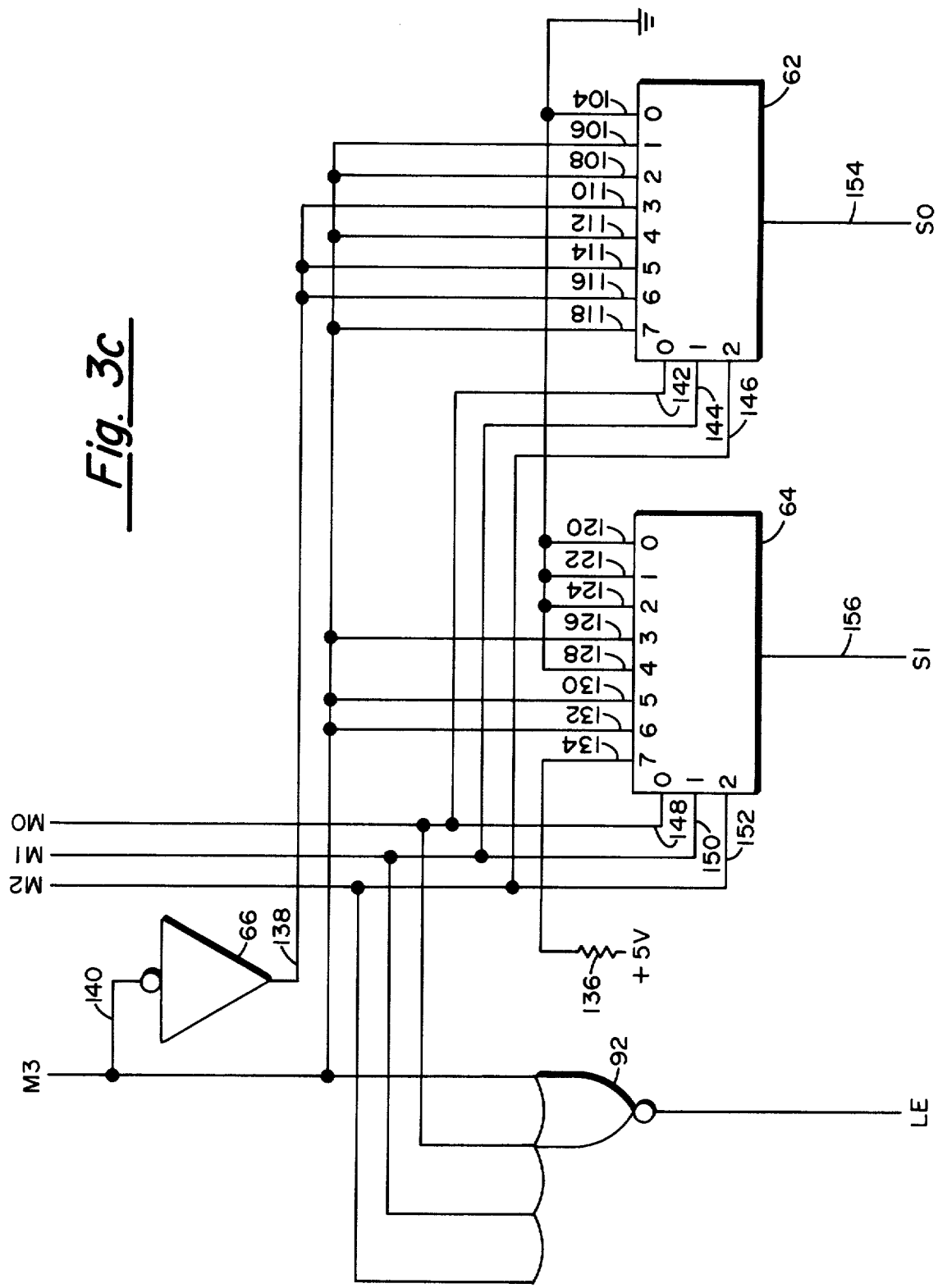

The two shift registers 58 in FIG. 3a, and 60, in FIG. 3b, then, at any one instant in time, provide a 4-bit output of a 4-bit segment of the mask word register 54 and the data word register 56, respectively. The 4-bit output of the mask shift register 58 is utilized in a number of different logical circuits. In FIG. 3c, the first function derived from this output is determined from the connection with selector circuits 62, 64 and 66. Circuits 62 and 64 represent eight input to single output selectors. An example circuit would be Texas Instrument Type No. SN54251. Circuit 66 is a single input and single output logical inverter, such as Texas Instrument Type No. SN5404. Input 104 of selector 62 and inputs 120, 122, 124 and 128 of selector 64 are connected to a logical ground. Input 106, 108, 112 and 118 of selector 62, along with inputs 126, 130 and 132, are connected directly to output 102 of mask shift register 58. Inputs 110, 114 and 116 of selector 62 are connected to output 138 of inverter 66. The single input 140 of inverter 66 is connected directly to output 102 of mask shift register 58. Input 134 of selector 64 is connected through resistor 136 to a positive voltage source. Selector input 142 of selector 62 and selection input 148 of selector 64, the 0 selection inputs, connected directly to output 96 of mask shift register 58. Selection input 144 of selector 62 and selection input 150 of selector 64, the 1 selection inputs, are connected directly to output 98 of mask shift register 58. Selection input 146 of selector 62 and selection input 152 of selector 64, the 2 selection inputs, are connected directly to output 100 of mask shift register 58. These two selectors 62 and 64 produce two output signals 154, designated S0, and 156, designated S1. These two logical outputs specify to the rest of the circuitry involved in the apparatus the number of the mask bits from outputs 96, 98, 100 and 102 of the mask shift register 58 which are set to a logical one. Outputs 154 and 156, representing signals $S_0$ and $S_1$ respectively, are shown in Table I for all combinations of outputs 96, 98, 100 and 102, representing $M_0$, $M_1$, $M_2$ and $M_3$, respectively.

Figure 3D:
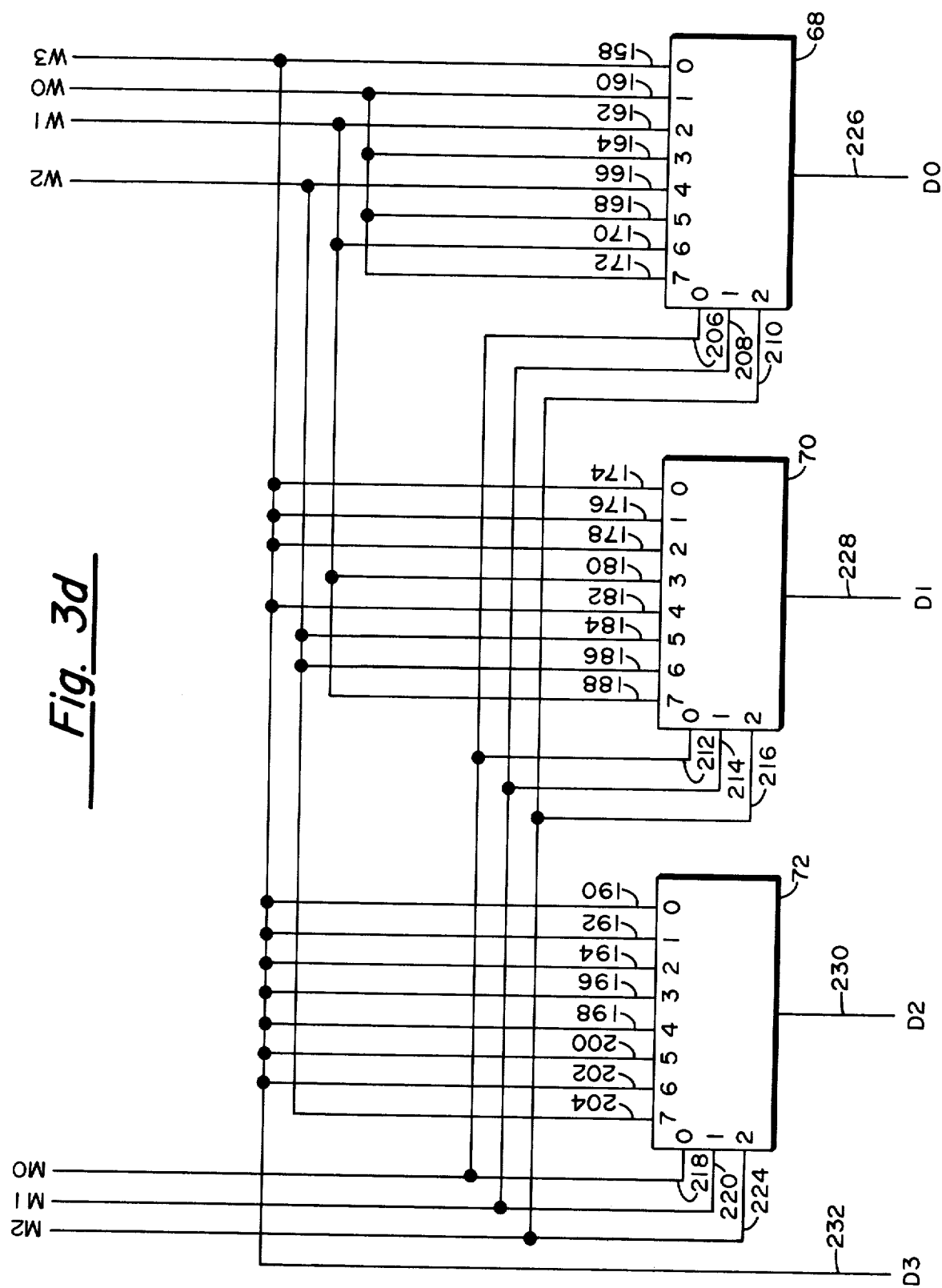

In FIG. 3d, circuits 68, 70 and 72 are also constructed from eight input-to-one output selectors of the same type utilized to construct selectors 62 and 64. Input 158 of selector 68 and inputs 174, 176, 178 and 182 of selector 70, along with inputs 190, 192, 194, 196, 198, 200 and 202 of selector 72, are connected directly to output 109 of data shift register 60, i.e., $W_3$. Inputs 160, 164, 168 and 172 of selector 68 are connected directly to output 103, i.e., $W_0$, of data shift register 60. Inputs 162 and 170 of selector 68, along with inputs 180 and 188 of selector 70, are connected directly to output 105, i.e., $W_1$, of data shift register 60. Input 166 of selector 68, along with inputs 184 and 186 of selector 70, and input 204 of selector 72, are connected directly to output 107, i.e., $W_2$, of data shift register 60.

The selection inputs of selectors 68, 70 and 72 are connected to the lower three bits of the output of the mask shift register 58. Output 96, i.e., $M_0$, of mask shift register 58 is connected directly to inputs 206 of selector

TABLE I

| $M_3$ | $M_2$ | $M_1$ | $M_0$ | $S_1$ | $S_0$ | Count |
|---|---|---|---|---|---|---|
| 0 | 0 | 0 | 0 | 0 | 0 | 1 |
| 0 | 0 | 0 | 1 | 0 | 0 | 1 |
| 0 | 0 | 1 | 0 | 0 | 0 | 1 |
| 0 | 0 | 1 | 1 | 0 | 1 | 2 |
| 0 | 1 | 0 | 0 | 0 | 0 | 1 |
| 0 | 1 | 0 | 1 | 0 | 1 | 2 |
| 0 | 1 | 1 | 0 | 0 | 1 | 2 |
| 0 | 1 | 1 | 1 | 1 | 0 | 3 |
| 1 | 0 | 0 | 0 | 0 | 0 | 1 |
| 1 | 0 | 0 | 1 | 0 | 1 | 2 |
| 1 | 0 | 1 | 0 | 0 | 1 | 2 |
| 1 | 0 | 1 | 1 | 1 | 0 | 3 |
| 1 | 1 | 0 | 0 | 0 | 1 | 2 |
| 1 | 1 | 0 | 1 | 1 | 0 | 3 |
| 1 | 1 | 1 | 0 | 1 | 0 | 3 |
| 1 | 1 | 1 | 1 | 1 | 1 | 4 |

68, 212 of selector 70 and 218 of selector 72. Output 98, i.e., $M_1$, of mask shift register 58 is connected to input 208 of selector 68, 214 of selector 70 and 220 of selector 72. Output 100, i.e., $M_2$, of mask shift register 58 is connected to input 210 of selector 58, 216 of selector 70 and 224 of selector 72. The outputs of these selectors, 72, comprise three of the four D signals in the circuit, i.e., $D_0$, $D_1$ and $D_2$, respectively. The fourth signal $D_3$, illustrated by reference numeral 232 in the FIG. 3, is obtained directly from the output of the data shift register 60 being output 109, i.e., $W_3$. These three selectors, 68, 70 and 72, perform the function of shifting the bit positions $W_0$, $W_1$, $W_2$ and $W_3$ to different bit positions in $D_0$, $D_1$, $D_2$ and $D_3$, depending upon the particular bits set in signals $M_0$, $M_1$ and $M_2$. The exact correspondence between these signals is illustrated in Table II. For example, for $M_0$, $M_1$ and $M_2$, all being logical 0's, signal $D_0$ is represented by the signal present on line $W_3$.

Circuits 74, 75, 76, 77, 78 and 79 (in FIG. 3e), 80, 81, 82, 83, 84 and 85 (in FIG. 3f) and 86, 87, 88 and 89 (in FIG. 3g) represent a series of 16 4-input to 1-output selectors. In these circuits, the signal present on the 0 input will be selected to the output when both of the selection inputs $S_1$ and $S_0$ are logical zeros, while the signal present on input 1 will be present at the output when selection input $S_0$ is a one and selection input $S_1$ is a zero, etc. An example of a commercially available circuit to perform this function is Texas Instrument Type No. SN54153. These circuits are normally packaged as integrated circuits with two 4-bit selectors in one package, each of the 4-bit selectors having common selection inputs. Therefore the

TABLE II

| $M_2$ | $M_1$ | $M_0$ | $D_3$ | $D_2$ | $D_1$ | $D_0$ |
|---|---|---|---|---|---|---|
| 0 | 0 | 0 | 15 | 15 | 15 | 15 |
| 0 | 0 | 1 | 15 | 15 | 15 | 12 |
| 0 | 1 | 0 | 15 | 15 | 15 | 13 |
| 0 | 1 | 1 | 15 | 15 | 13 | 12 |
| 1 | 0 | 0 | 15 | 15 | 15 | 14 |
| 1 | 0 | 1 | 15 | 15 | 14 | 12 |
| 1 | 1 | 0 | 15 | 15 | 14 | 13 |
| 1 | 1 | 1 | 15 | 14 | 13 | 12 | selection inputs need only be connected externally once for each pair of 4-bit selectors.

Figure 3E:
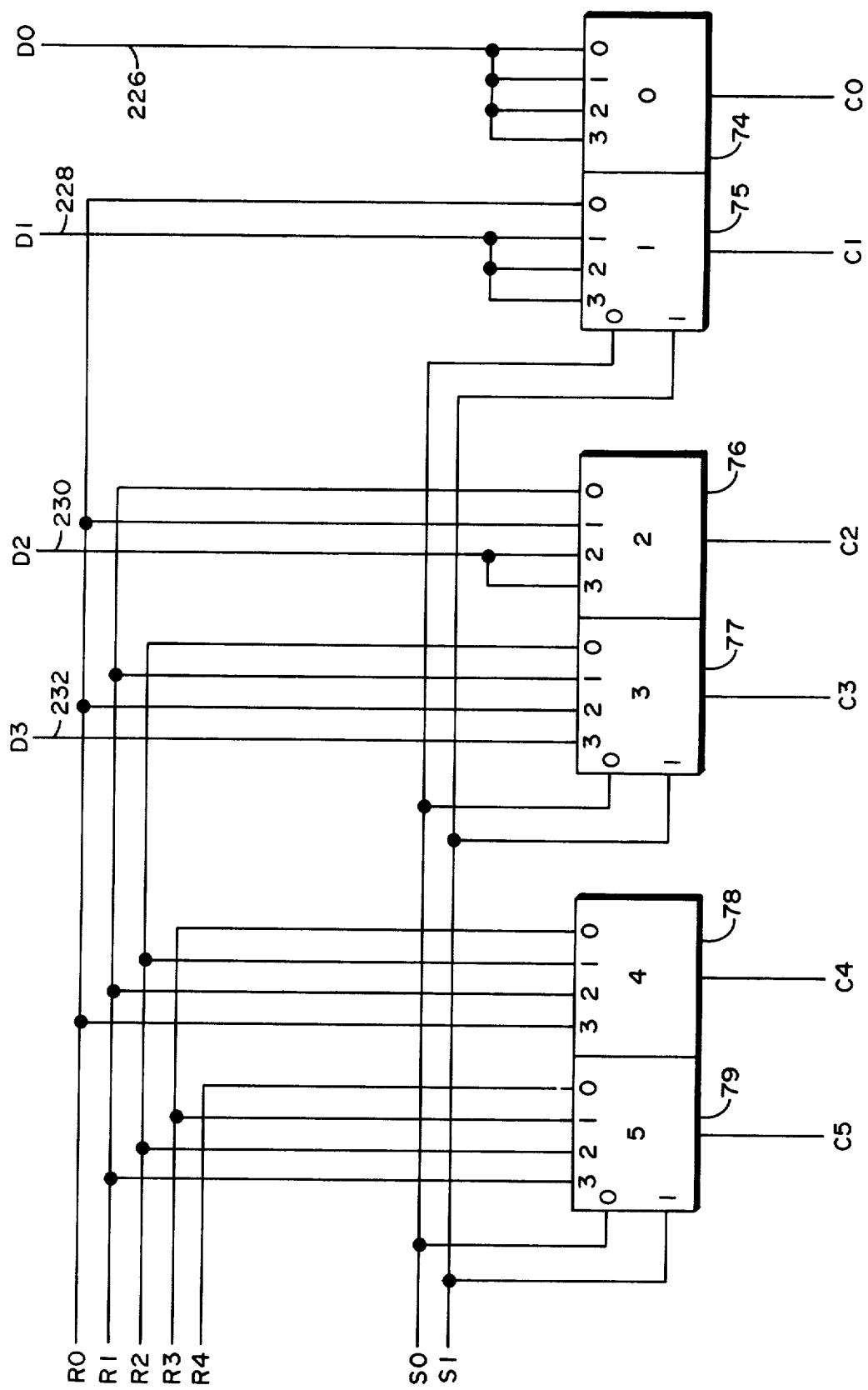
Figure 3F:
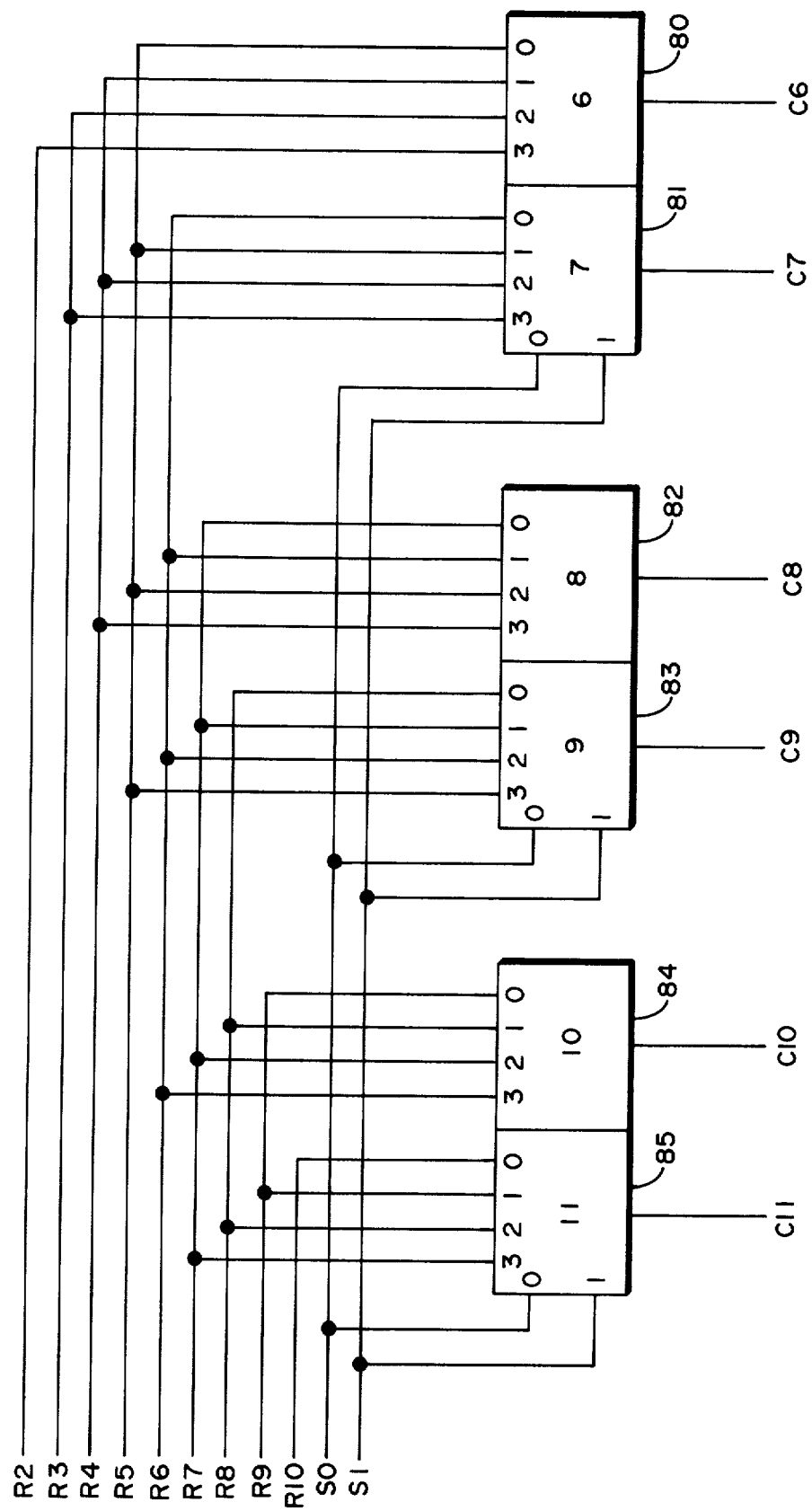
Figure 3G:
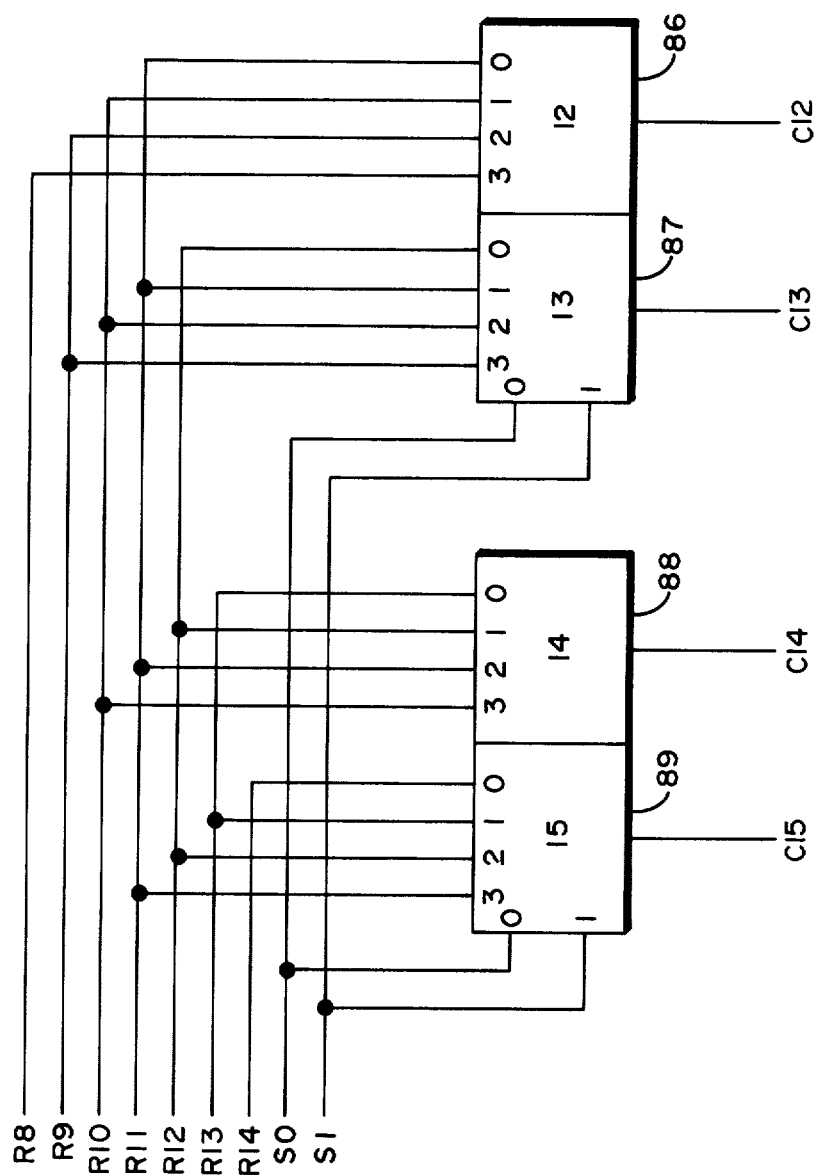

In FIG. 3e, signal 226, i.e., $D_0$, is connected to all four of the inputs of selector 74. Signal 228, i.e., $D_1$, is connected to the 1 input, 2 input and 3 input of selector 75. Signal 230, i.e., $D_2$, is connected to the 2 input and the 3 input of selector 76, and signal 232, i.e., $D_3$, is connected to the 3 input of selector 77. The selection inputs for all of the selectors 74 through 89, in FIGS. 3e, 3f and 3g, are identically connected. The 0 selection input of all of these units is connected directly to line 154, i.e., $S_0$, while the 1 selection input for all of these units is connected directly to line 156, i.e., $S_1$.

Figure 3H:
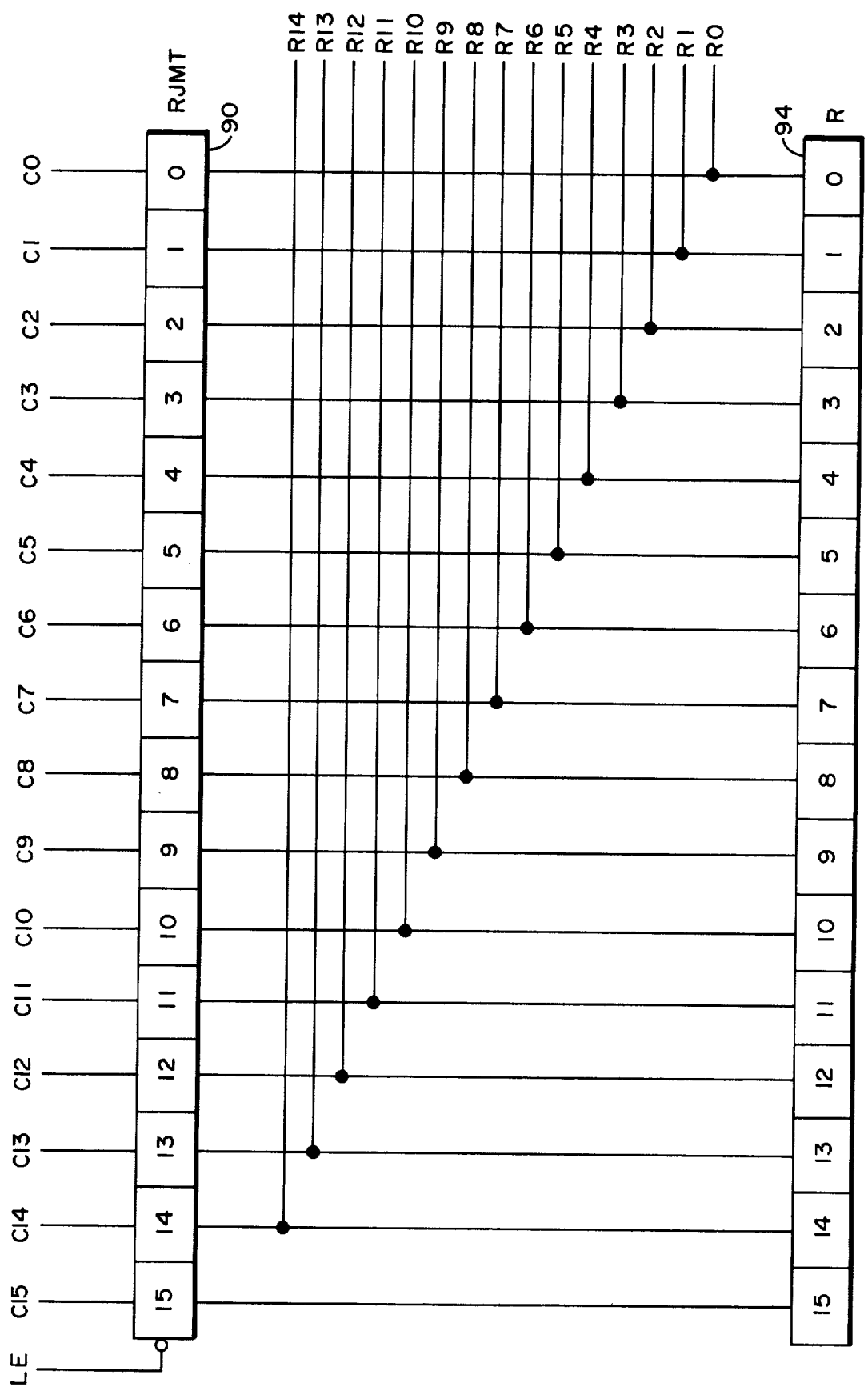

The single output from each of the selectors 74 through 89 are individually connected to the data inputs of a 16-bit holding register 90 in FIG. 3h. An example of a circuit which could be utilized to construct this holding register is Texas Instrument Type No. SN54116. The "Load Enable" input of all of the stages in the holding register 90 are connected to the single output of NOR circuit 92, in FIG. 3c, which has four inputs. An example of a 4-input NOR circuit which could be utilized is Texas Instrument Type No. SN5425. The four inputs of NOR circuit 92 are individually connected to lines 96, 98, 100 and 102 respectively labeled $M_0$, $M_1$, $M_2$, and $M_3$. With a low level active "Load Enable" input on the holding register 90, NOR circuit 92 will enable the loading of holding register 90 in all cases except when all of the bits from the mask shift output 44 are zeros, in which case loading of the holding register 90 will be inhibited. In FIG. 3h, the outputs of holding register 90 are individually connected to the data inputs of another 16-bit register 94 which collects the final result of the right justified mask transfer operation.

However, as is shown in FIG. 3h and also FIGS. 3e, 3f and 3g, the outputs of the holding register 90 are also coupled back into the inputs of selectors 75 through 89. An example of these connections is the output of bit 0 from holding register 90, in FIG. 3h, which is coupled into input 0 of the bit 1 selector, gate 75, to the 1 input of the bit 2 selector, gate 76, to the 2 input of the bit 3 selector, gate 77, then to the 3 input of the bit 4 selector, gate 78 in FIG. 3e. All of the other bits of the holding register 90 are connected in a similar fashion to the inputs of the other bit selectors 75 through 89. That is, the output of any given bit from holding register 90 is coupled to the 0 input of the next higher bit selector, to the 1 input of the bit selector two bits higher, to the 2 input of the bit selector three bits higher and to the 3 input of the bit selector four bits higher. These connections are repeated through bit 14 of holding register 90. Bit 15 of holding register 90, having no higher bits in selectors 75 through 89, is not additionally connected.

Thus, it has been shown that mask shift register 58 and data shift register cooperate to provide 4-bit segments of the mask word and data word to be operated on iteratively by the rest of the circuitry. Circuits 62 and 64 and 66 cooperate to provide a binary output indicating the number of bits which are set in the 4-bit mask segment produced by the mask shift register 58. The mask shift segment produced by mask shift register 58 is also utilized in circuits 68, 70 and 72 to shift the 4-bit word segment produced from the data word shifter 60 to a right justified condition depending upon the bits set in the mask segment on the individual 4-bit basis. The data produced by circuits 68, 70 and 72 is then utilized in selectors 74 through 89 along with the mask bit set count produced in circuits 62 and 64 to insert the proper number of right justified bits produced by circuits 68, 70 and 72 and $W_3$. The holding register 90, along with the intercoupling back to the selectors 74 through 89, collect the successive results of the right justification process of 4-bit basis; that is, as the mask shift register 58 and data shift register 60 provide an additional 4-bit mask and word segments to be right justified, the holding register 90 and selectors 74 through 89 cooperate to move the intermediate result already collected in holding register 90 left the number of positions necessary to allow for the insertion of the new right justified intermediate result produced from the new 4-bit mask and word segments.

Figure 4:
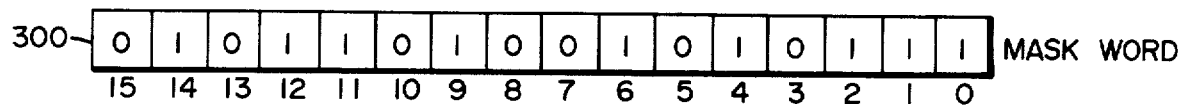
FIG. 4 illustrates a first iteration involving the logic described schematically in FIG. 3.
Figure 4:
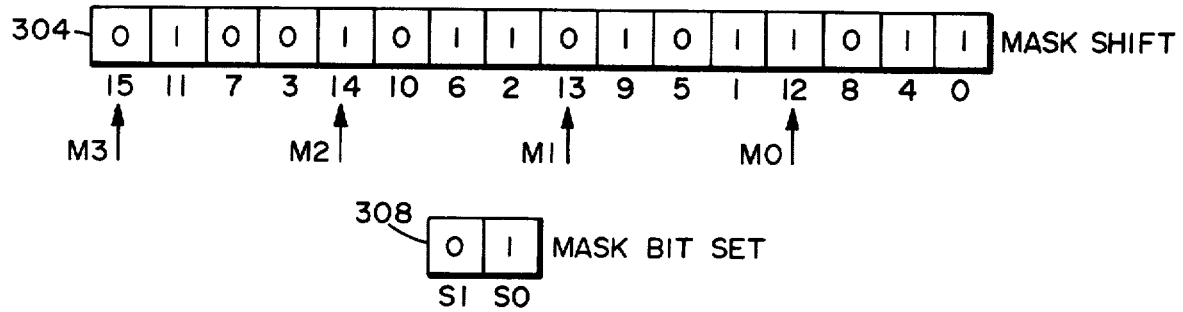
Figure 4:
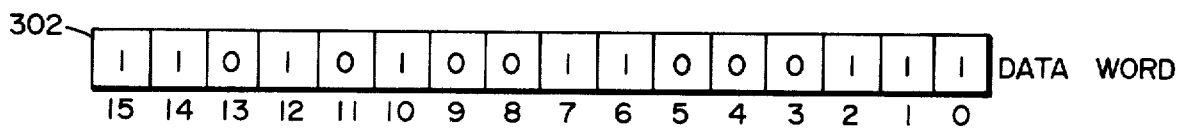
Figure 4:
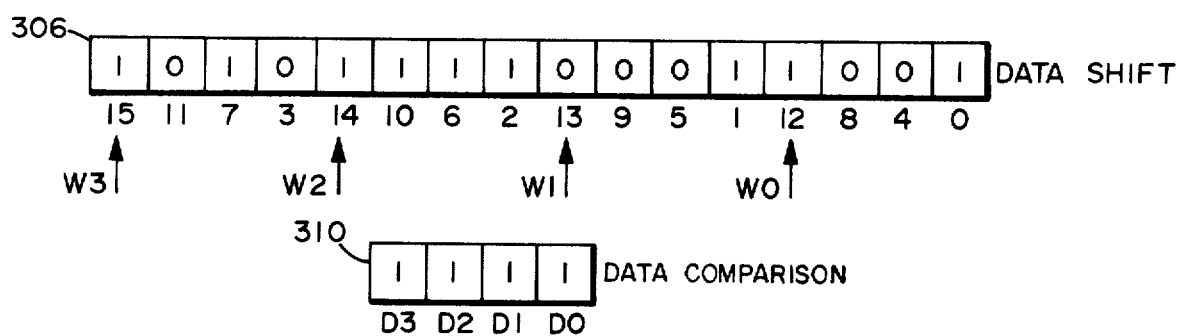
Figure 4:
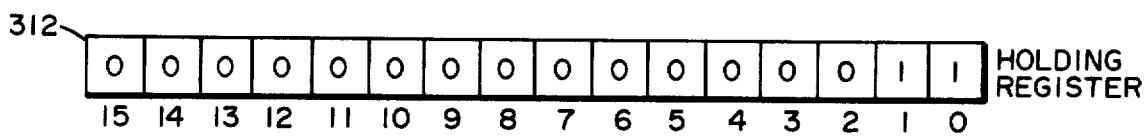
Figure 5:
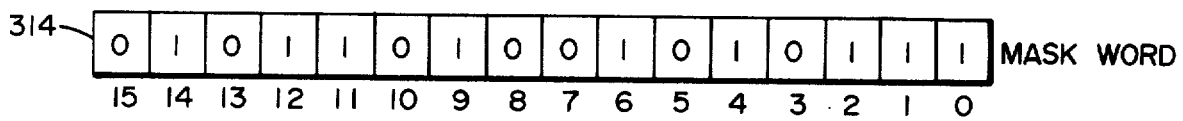
FIG. 5 provides an illustration of a second iteration utilizing the logic described by the schematic in FIG. 3.
Figure 5:
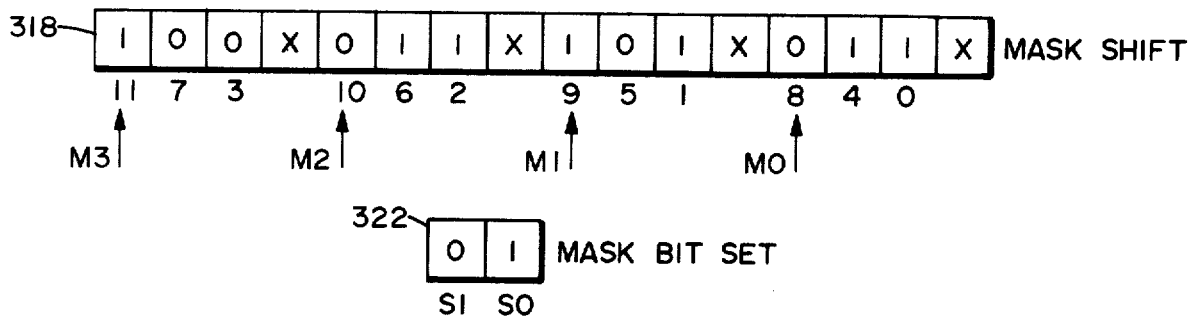
Figure 5:
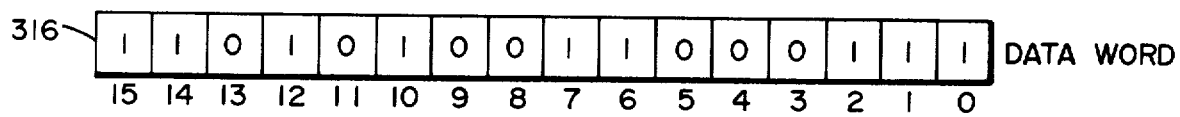
Figure 5:
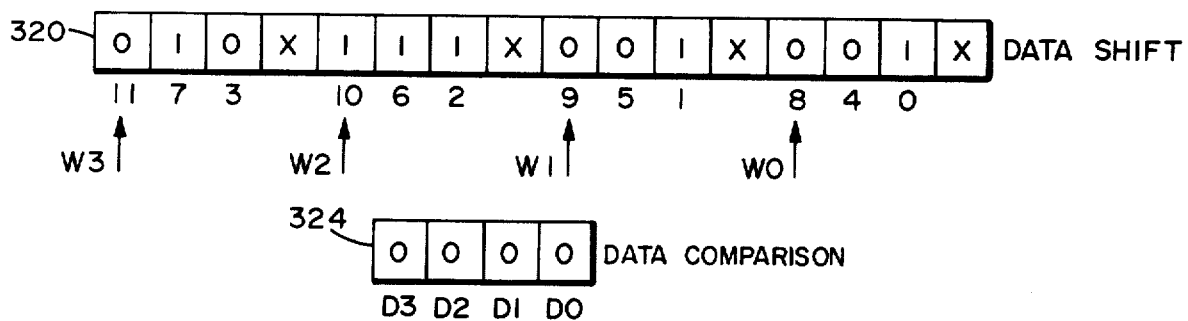
Figure 5:
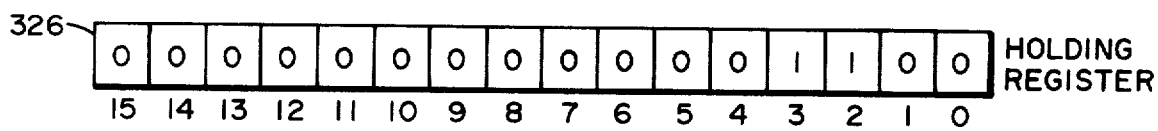
Figure 6:
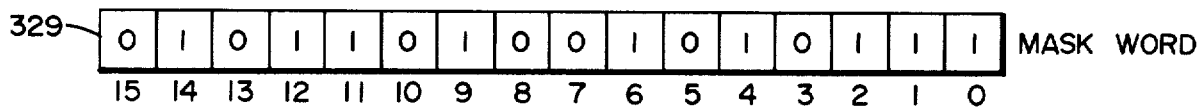
FIG. 6 provides an illustration of a third iteration utilizing the logic described in the schematic of FIG. 3.
Figure 6:
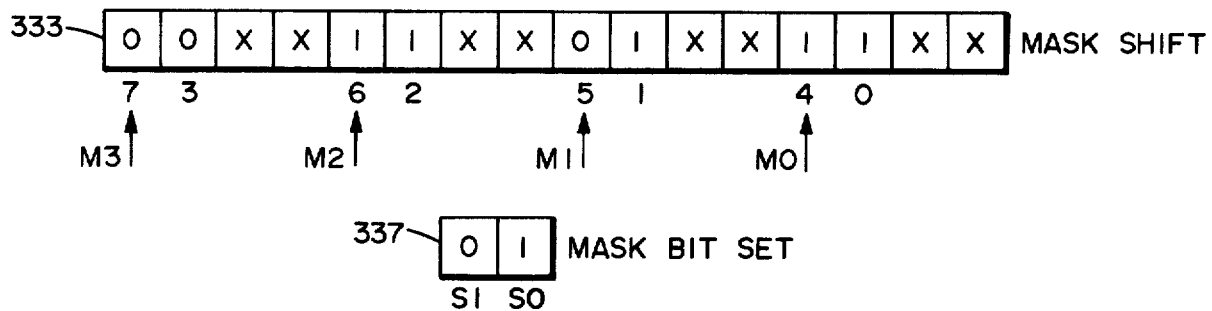
Figure 6:
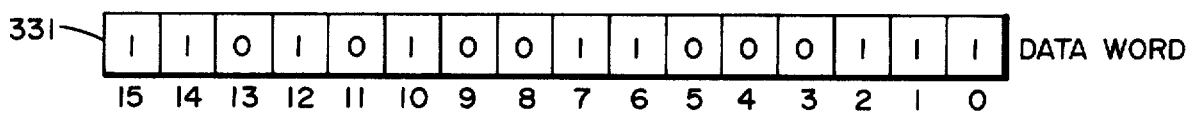
Figure 6:
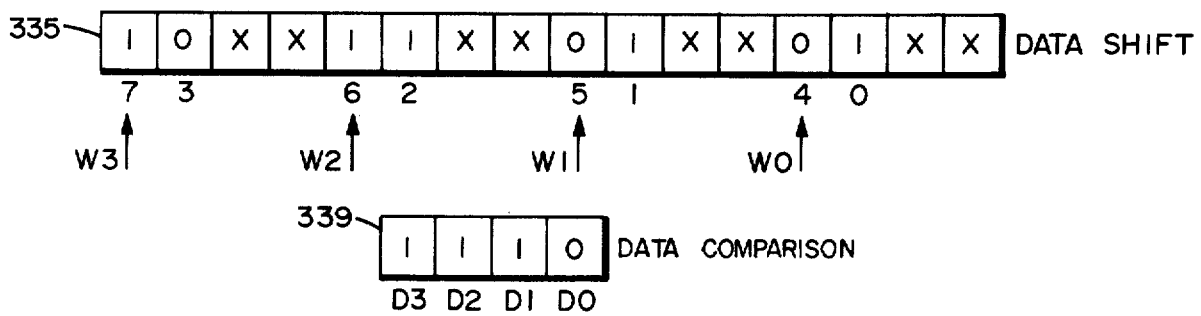
Figure 6:
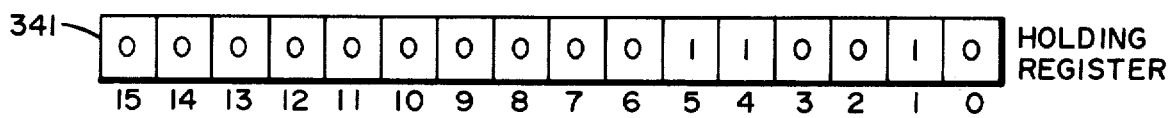
Figure 7:
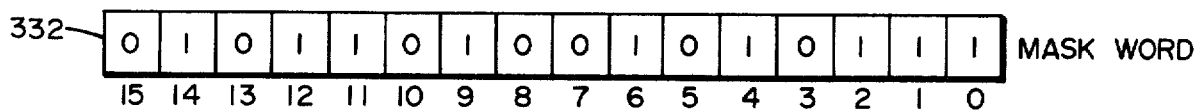
FIG. 7 provides an illustration of a fourth and last iteration utilizing the logic described schematically in FIG. 3.
Figure 7:
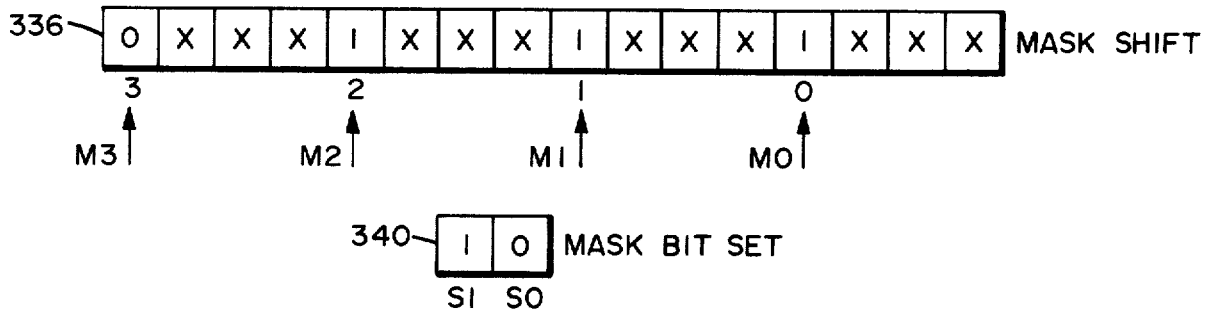
Figure 7:
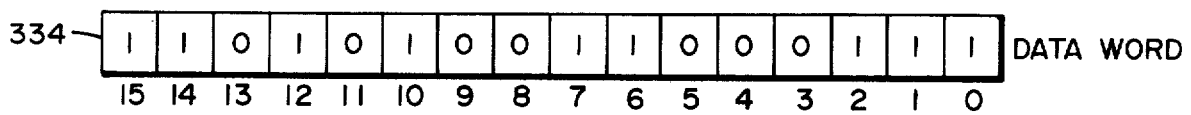
Figure 7:
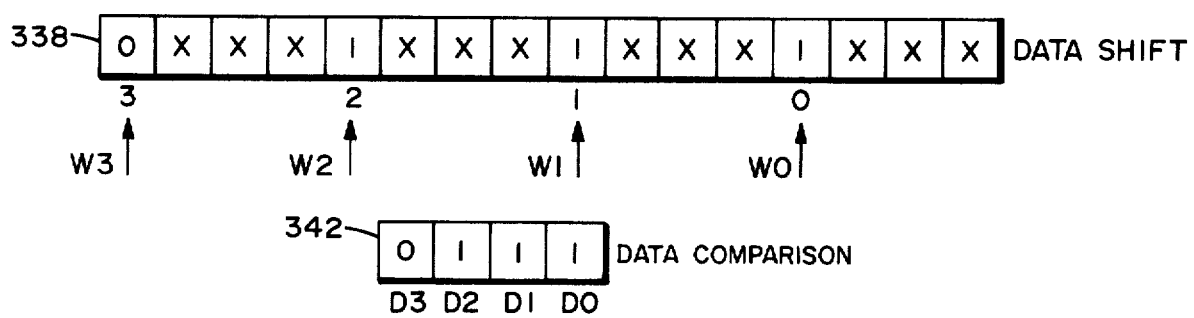
Figure 7:
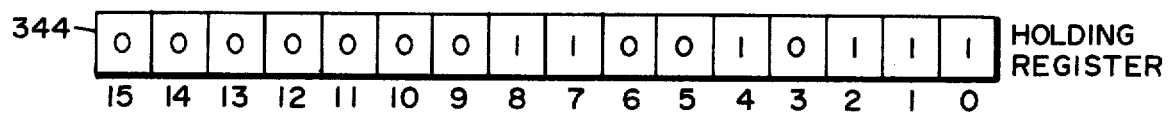

The operation of the circuitry described in FIG. 3 will become more clear with the performance of an exemplary calculation. Assume that the mask word stored in register 54 is 0101101001010111 and the data word in register 56 is 1101010011000111. As noted above, the mask bit shifting means and the data shifting means operate to provide the rest of the circuitry with 4-bit segments of the mask word and data word. Since the mask word and data word are presumed to be 16 bits long, four sequential operations are necessary to complete the calculation. FIGS. 4 through 7 provide a binary representation of the signals present at the various locations in the circuitry in FIG. 3 at each step of the four step sequence. FIG. 4 represents the first sequence, i.e., the sequence in which the data shifting means and mask shifting means are examining the upper four bits of the data and mask registers; that is, bits 12 through 15. FIG. 5 represents the second step in the sequence; that is, when the data and mask shifting means are examining upon bits 8 through 11. FIG. 6 represents the third step in the sequence; that is, when the data and mask shifting means examining bits 4 through 7. Finally, FIG. 7 represents the last step of the sequence; that is, when the data and mask shifting means are examining bits 0 through 3. Since FIG. 7 also represents the last step in the sequence, FIG. 7 also illustrates the final result.

Referring to FIG. 4, the mask word to be operated upon and stored in register 54 of FIG. 3 is represented by reference numeral 300. The data word to be operated upon and stored in register 56 of FIG. 3 is represented by reference numeral 302. The contents of the mask shift register 58 of FIG. 3 are represented by reference numeral 304 in FIG. 4. The entire contents of the mask shifting register is shown as reference numeral 304, with the bit significance scrambled as is the case in the mask shift register 58 of FIG. 3. Note, however, that only four bits of the 16-bit mask shift register are utilized as outputs. These are illustrated in FIG. 4 as arrows and labeled $M_0$, $M_1$, $M_2$ and $M_3$. These are the same signals as lines 96, 98, 100 and 102, respectively, in FIG. 3.

The contents of the data shift register 60 of FIG. 3 is illustrated by reference numeral 306. Again, the entire register is given with the scrambled bit positions and the 4-bit output is indicated by arrows labeled $W_0$, $W_1$, $W_2$ and $W_3$ and are the same signals as lines 103, 105, 107 and 109 of FIG. 3. The output of the mask bit set means is illustrated in FIG. 4 as reference numeral 308. The digits are labeled $S_1$ and $S_0$ and have direct correlation to lines 156 and 154, respectively, in FIG. 3. The output of the data comparison means is indicated in FIG. 4 by reference numeral 310 and are labeled $D_0$, $D_1$, $D_2$ and $D_3$ and have direct correlation to lines 226, 228, 230 and 232, respectively, of FIG. 3. The result contained in holding register 90 of FIG. 3 is illustrated by reference numeral 312 in FIG. 4.

In the first step of the four step sequence illustrated in FIG. 4, the 4-bit mask segment reading from most significant to least significant bit position is 0101, while the data segment is 1101. Since only mask bit positions $M_2$ and $M_0$ are logical ones, only the corresponding data positions $W_2$ and $W_0$ will be considered. As a result, $D_0$ at reference numeral 310 is a logical 1 corresponding to the data set in $W_0$ and $D_1$ is also a logical 1 corresponding to the data set at $W_2$. As shown in FIG. 4, $D_2$ and $D_3$ both are also logical 1's but since only two bits were set in the mask shift segment, only two bits will be inserted into the holding register and so the actual content of $D_2$ and $D_3$ in this step is immaterial. The mask bit set indication 308 is a 01 indicating that two bits of the mask shift segment are set. The data contained in the mask bit set 308 and data comparison 310 are then combined to allow the lower two bits of the data comparison 310 to be inserted into the lower two bit positions of holding register 312. All of the upper bit positions are indicated in FIG. 4 as 0's, indicating a previously cleared condition.

With the first two bits inserted in the holding register, consideration will next be given to the second step in the sequence illustrated in FIG. 5. The mask word 314 and the data word 316 remain exactly the same as they were in FIG. 4 designated as 300 and 302, respectively.

The contents of the mask shift register 318 has been shifted one bit to the left. This has the effect of providing bits 8, 9, 10 and 11 as outputs $M_0$, $M_1$, $M_2$ and $M_3$. Also the contents of the data shift register 320 has been shifted one place to the left and has the effect of causing bits 8, 9, 10 and 11 as outputs $W_0$, $W_1$, $W_2$ and $W_3$. The 4-bit mask segment now is a 1010 and since two bits are also set in this segment, the contents of the mask bit set output 322 is also 01. The data segment is a 0100. Since only $M_3$ and $M_1$ are logical 1's, we are only concerned with the data contained in $W_3$ and $W_1$ which are both logical 0's. Therefore, the contents of data comparison means 324, $D_0$, is a logical 0 corresponding to $W_1$ and $D_1$ is a logical 0 corresponding to $W_3$. Again, since only two bits are set in the mask shift segment, the contents of $D_2$ and $D_3$ are immaterial but here are illustrated as 0's also. Since the mask bit set 322 indicates two bits in the mask shift segment are set, the lower two bits of data comparison 324 are inserted into the lower two bit positions of holding register 326. At the same time, the previous contents of the holding register are shifted left two bits positions, thus creating the 1100 bit pattern in holding register 326. The two 1's are left over from the first step in the sequence and the two 0's represent the data inserted during the current step of the sequence.

The third step in the four step sequence is illustrated in FIG. 6. Here the mask word 329 and the data word 331 are unchanged from the first step in the sequence. The mask shift register output 333 is shifted left one more bit position from that in the second step sequence such that bits 4, 5, 6 and 7 represent the mask segment output $M_0$ through $M_3$. Also the data shift register 324 has been shifted left one more bit position from the last step of the sequence such that bits 4 through 7 are present at the outputs $W_0$ through $W_3$. At this step of the sequence, the mask segment is a 0101. Since two bits of the mask segment are set, the mask bit set 337 output is a 01 as it was in the first two steps of the sequence. Since mask segment bits $M_2$ and $M_0$ are logical 1's, we are concerned only with the data contained in $W_2$ and $W_0$. Since $W_0$ is a 0, a 0 is loaded into $D_0$ of the data comparison means 339. Since $W_2$ is a 1, a 1 is loaded into $D_1$ of data comparison means 339. Again, since only two bits of the mask segment are set, the contents of $D_2$ and $D_3$ are immaterial. The two pertinent bits of data comparison 339 are inserted into the lower two bit positions of holding register 341. The four other significant bits previously contained in the holding register are shifted left two bit positions to allow space for the insertion of the two new bits. Thus, the significant bits included in holding register 341 have now increased to six and are represented as a 110010 with the 1100 being indicative of previous operations and the 10 being representative of the data inserted during this sequence.

The last step of the sequence is illustrated in FIG. 7. Again the mask word 332 and data word 334 are unchanged from the beginning of the first step of the sequence. The contents of the mask shift register 336 have again been shifted left one bit position such that bits 0, 1, 2 and 3 are present at the mask segment outputs $M_0$, $M_1$, $M_2$ and $M_3$, respectively. Also, the contents of the data shift register 338 have been shifted left one bit position such that bits 0, 1, 2 and 3 are present at the outputs $W_0$, $W_1$, $W_2$ and $W_3$, respectively. The 4-bit mask segment now is a 0111. Since three bits of this segment are set to a 1, the mask bit set output 340 is a 10. Since $M_2$, $M_1$ and $M_0$ are logical 1's, we are concerned with the data located at $W_2$, $W_1$ and $W_0$. Since all three of these bit positions are logical 1's, $D_2$, $D_1$ and $D_0$ of data comparison 342 are set to 1's, representing the right justified mask of this 4-bit segment. Again, since only three bits are set, the contents of $D_3$ are immaterial. Since the mask bit set 340 indicates that three bits of the mask segment are set to a 1, three bits of the data comparison 342 are now inserted into the lower bit positions of holding register 344 indicated as a 111. The data previously held in the holding register has been shifted left a corresponding three bit places to make room for the new data. Since this is the last iteration in the 4-step sequence, the holding register 344 now contains the final result. The holding register now contains nine significant bit positions analogous to the nine bits set in the mask word 332. The 110010 is representative of previous sequences and the 111 is representative of data inserted during this cycle. The most significant seven bits of holding register 344 are indicated as 0's as a result of an initial clear operation.

Thus, it can be seen that there has been shown and described a novel apparatus for performing a right justified mask transfer function. It is to be understood, however, that various changes, modifications and substitutions in the form of the details of the described apparatus can be made by those skilled in the art without departing from the scope of the invention as defined by the following claims.

What is claimed is:

1. A digital logical network for implementing a mask transfer function so that a series of noncontiguous bits contained in an n-bit mask word controls a mask operation with an n-bit data word and arranges the result of said mask operation contiguously in a result register, comprising:
    a. mask shifting means selectively coupled to receive said mask word and having a mask shift output, said mask shift output adapted to produce signals representing an m-bit contiguous portion of all of said bits of said mask word and including means for sequentially changing said mask shift output from said portion of bits in said mask word to the next contiguous portion of bits of said mask word;
    b. mask bit set means selectively coupled to said mask shift output for determining the number of bits which are of a predetermined binary significance in said mask shift output;
    c. data shifting means selectively coupled to said data word and having a data shift output, said data shift output being an m-bit contiguous portion of all of said bits of said data word and including means for sequentially changing said data shift output from said portion of bits in said data word to the next m-bit contiguous portion of bits of said data word;
    d. data comparison means, selectively coupled to said data shift output and controlled by said mask shift output for iteratively performing a bit-by-bit comparison between said mask shift output and said data shift output and for shifting the results of said comparison only for bit positions of said predetermined binary significance in said mask shift output to contiguous bit positions; and
    e. result collecting means, selectively coupled to said data comparison means and said result register and responsive to said mask bit set means, for iteratively collecting the successive results of said data comparison means so that successive results are kept in contiguous order throughout successive changes in said mask shifting means and said data shifting means.

2. A digital logical network as in claim 1 wherein said mask shifting means comprises an n-bit shift register which partitions said n-bit mask word into b-bytes of $m$ bits per byte, having as an output at one instant of time all of the $m$ bits in one byte and having as an output at successive instants of time all of the $m$ bits of other bytes in a more significant to less significant order.

3. A digital logical network as in claim 1 wherein the mask bit set means comprises a series of $x$ selectors where $x$ equals $\log_2 m$ each having $2^{(m-1)}$ data inputs, $(m-1)$ selection inputs and a single output, said selection inputs being selectively coupled to all but one of said $m$ outputs of said mask shifting means and said data inputs being selectively coupled to the remaining output of said mask shifting means and to means for establishing a logical one and zero selectively, said series of $x$ selectors producing an $x$-bit output code on said selector's single output which is a binary representation of the number of said $m$ outputs of said mask shifting means which are of a predetermined binary significance.

4. A digital logical network as in claim 1 wherein the data shifting means comprises an $n$-bit shift register which partitions said $n$-bit data word into $b$ bytes of $m$ bits per byte, having as an output at one instant of time all of the $m$ bits in one byte and having as an output at successive instants of time all of the $m$ bits of other bytes in a more significant to less significant order.

5. A digital logical network as in claim 1 wherein the data comparison means comprises a series of $(m-1)$ selectors each having $(m-1)$ selection inputs, $2^{(m-1)}$ data inputs and a single output, said selection inputs being selectively coupled to all but one of said $m$ outputs of said mask shifting means and said data inputs being selectively coupled to said $m$ outputs of said data shifting means so that a data comparison means output consists of all of the single outputs of said selectors and the output of said data shifting means having the most significance, said data comparison means output being a shifted representation of a mask operation between said outputs of said mask shifting means and said outputs of said data shifting means with the result of said mask operation including only those bit positions which were a logical one in said output of said mask shifting means being shifted toward the least significant bit position and the remaining more significant bit positions being a logical zero.

6. A digital logical network as in claim 3 wherein said result collecting means comprises:
    a. a series of $n$ selectors each having $x$ selection inputs, $m$ data inputs and a single output, said selection inputs being coupled to said outputs of said mask bit set means;
    b. an $n$ bit holding register individually coupled to said outputs of said series of $n$ selectors; and
    c. means connecting said data inputs of said selectors to said outputs of said data comparison means and to said holding register's outputs such that the data contained in said outputs of said data comparison means is collected into the lowest significant positions of said holding register depending upon the output of said mask bit set means and said data already contained in said holding register is shifted in a more significant direction responsive to said output of said mask bit set means.

7. A digital logical network for implementing a mask transfer function so that a series of noncontiguous bits contained in an $m$ bit mask word controls a mask operation on an $m$ bit data word and arranges the result of said mask operation contiguously in a result register, comprising:

a. a series of $(m-1)$ selectors, each said selector having $2^{(m-1)}$ data inputs, $(m-1)$ selector inputs and a single output, said selection inputs being selectively coupled to the lower order $(m-1)$ bits of said mask word and said data inputs being selectively coupled to receive said data word; and b. means connecting said series of $(m-1)$ selectors with said $m$-bit data word so that the output of said series of $(m-1)$ selectors includes said $(m-1)$ single outputs of said selectors and the bit of said data word having the most significance, said output being a shifted representation of a mask operation between said data word and said mask word with the result of said operation including only those bit positions which were a logical one in said mask word and being shifted toward the least significant bit position and the remaining bit positions being a logical zero.

8. An apparatus for performing a mask transfer function, said function including a bit-by-bit comparison of a data word containing a plurality of bits with a mask word containing a plurality of bits, the results of said comparison being a logical one where both said bit in said data word and said bit in said mask word are both logical ones and the result of said comparison being a logical zero if either said bit in said data word or said bit in said mask word is a logical zero, and a transfer of only the bits of said result which correspond to bits in said mask word which are logical ones to a result register in a contiguous location therein, the remaining bits of said result register being a logical zero, comprising:

a. mask shifting means selectively coupled to receive said mask word and having a mask shift output, said mask shift output being a contiguous portion of all of said bits of said mask word and including means for changing said mask shift output from said portion of bits in said mask word to the next contiguous portion of bits of said mask word;

b. mask bit set means selectively coupled to said mask shift output for determining the number of bits which are set to a logical one in said mask shift output at any given time;

c. data shifting means selectively coupled to receive said data word and having a data shift output, said data shift output being a contiguous portion of all of said bits of said data word and including means for changing said data shift output from said portion of bits in said data word to the next $m$-bit contiguous portion of bits of said data word;

d. data comparison means, selectively coupled to said data shift output and controlled by said mask shift output, for iteratively performing a bit-by-bit logical AND operation between the mask shift output and data shift output and for shifting the results of said logical AND operation only for bit positions set to a logical one in said mask shift output to contiguous bit positions and disregarding all other bit positions; and e. result collecting means, selectively coupled to said data comparison means and said result register and responsive to said mask bit set means, for iteratively collecting the successive results of said data comparison means in such a manner that said successive results are kept contiguous throughout successive changes in said mask shifting means and said data shifting means.

* * * * *

UNITED STATES PATENT AND TRADEMARK OFFICE
CERTIFICATE OF CORRECTION

PATENT NO. : 4,085,447
DATED : April 18, 1978
INVENTOR(S) : Jerry Hudson Pertl, et al It is certified that error appears in the above-identified patent and that said Letters Patent are hereby corrected as shown below:

Column 11, line 67, "so that successive" should be

--so that said successive--.

Column 13, line 8, "selector inputs" should be --selection inputs--.

Signed and Sealed this

Twenty-sixth Day of September 1978

[SEAL]

Attest:

RUTH C. MASON
Attesting Officer

DONALD W. BANNER
Commissioner of Patents and Trademarks